Patented Feb. 16, 1954

2,669,522

UNITED STATES PATENT OFFICE 2,669,522

METHOD OF PREPARING MOLDED PRODUCTS OF LIGNOCELLULOSE AND LIGNIN

Donald F. Othmer, Coudersport, Pa., and Warren R. Smith, Crown Point, N. Y.

No Drawing. Application December 16, 1950, Serial No. 201,243

2 Claims. (Cl. 106—123)

This invention relates to a method of preparing bonded mixtures of lignocellulose and lignin by pressing said mixtures under the application of heat, and it also relates to the bonded and pressed products produced by said method in the form of wallboard and similar materials.

Herein the term "lignocellulose" is used to describe both the liberated fibers as obtained after any grinding or defibrating means and also the naturally occuring unliberated fibers as they exist in trees or in sawdust, slabs, edgings, bagasse and other annual plant residues, and the like. The term "lignin" refers to the residue, either with or without metallic ions such as sodium or calcium which remains after lignocellulose has been treated in one way or another to remove a part or substantially all of the cellulose.

Fibers or particles of wood and annual plant material have been formed and compressed into wallboards by wet processes or methods for many years. The wet process used varies from company to company and compares closely with paper making. The raw materials (such as fiber, water proofing agents and sizes) and the methods of production are similar. Chips from cordwood (not waste wood such as sawdust, shavings, slabs) are made into fibers of a particular mesh size by one of several methods, usually involving expensive equipment and processing steps. The fibers are washed, refined, screened, and fed to a Fourdrinier machine similar to the standard paper making machine, where the board is formed as a thick continuous mat, known as "wet lap." After this "wet lap" is trimmed and cut to size, the individual pieces are placed on screens and inserted between the stem heated platens of a press and pressed at pressures of 1,000 pounds per square inch or higher for 30 minutes or longer. A large amount of water is removed in a heating cycle long enough to dry and cure the boards. To reduce the long press cycle, the mat may be pre-pressed first to remove much of the water, or sent through a very large drier. Equipment such as chippers, high pressure boilers, and washers, besides all the special handling and loading machines used in such prior art processes, are very expensive. This high cost of breaking whole wood or wood logs down into its individual fibers and the attendant complications and skill required in the subsequent operations indicates that the making of wallboard by the wet process must be a very large business enterprise by itself and not something to be appended to an existing wood working industry.

In addition to the wet process of making wallboard, substantially as described above, there have been introduced within the past ten years or so, three different types of processes utilizing resins. These are:

(1) Dry powdered synthetic resin is mixed with substantially dry wood fiber, the moisture content of wood varying from 1–15%; and a dry forming and pressing process is used.

(2) Synthetic resin in a liquid solution or dispersion is added to relatively dry wood fiber, the moisture content of which is less than 5%; and a dry forming and pressing process is used.

(3) Synthetic resin in a liquid solution or dispersion is added to a wet slurry of wood fiber; and a wet forming process is used.

The synthetic resins used in the above processes are not only expensive, ranging up to 25 to 40 cents per pound, and therefore having a value much more than any wood waste used, but the percentage of the resins based on the wood waste used is high since it may be from 10 to 25%, although lower amounts have been used with poor results. In some cases the producer of such resin bonded boards has actually found himself in the chemical business of making the required resins or purchasing them on a large scale, rather than keeping to his own business of wood working or wood processing.

It is an object of our invention to produce a bonded product of the nature of wallboard by compressing and heating lignocellulosic material of whatever origin or variety with lignin.

It is also an object of our invention to provide a method of producing inexpensive, water resistant and permanently bonded products of varying thicknesses, densities, hardnesses, shapes, and having other similar desirable properties.

These and other objectives are readily apparent upon reading this disclosure of our invention:

According to our invention we prepare a mixture of lignocellulose material; for example, sawdust or wood flour, and powdered lignin; and we thereafter subject the prepared mixture to specific temperature and pressure ranges for definite periods of time to effect a permanent bond between the lignocellulose and the admixed lignin.

The specie of wood used may be of the deciduous type or of the conifer type; or it may be a lignocellulose material from any of the annual agricultural products such as bagasse, coconut fibers, and the like.

Ground or comminuted wood prepared by any mechanical process as, for example, from an attrition mill, hammer mill, stone mill, or from any combination of a steam and mechanical disintegrating process, such as the Asplund or Masonite process, and the like, can be used.

The moisture content of the lignocellulose to be used may vary considerably, and it is preferred that the lignocellulose possess a substantially dry feel and appearance. Lignocellulose containing substantially 0 to about 50 percent moisture (based on its total weight) may be used. Thus, for example, freshly sawn wood, i. e., sawdust, or bagasse, either having a moisture content up to about 50 percent, or sawdust having the normal air-dry moisture content of about 10 percent, as well as bone-dry sawdust, are all operable and give satisfactory results in our process.

The preferred size of the lignocellulose is from 16 to 30 mesh, though mesh sizes above and below this range are operable, particularly long fibers or thin shavings up to one inch square or larger have been used.

The lignin we use consists substantially of the non-polysaccharide constituents of wood and other lignin containing plants and is that part of the plant which does not dissolve in a specified concentrate of sulfuric acid under specified physical conditions. Lignin containing more or less cellulose is commercially available as a by-product of various paper making processes using wood or other lignocellulose from either trees or annual plants, such as (1) the soda process, and (2) the sulfate or kraft process, and (3) the sulfite process. Lignin may also be obtained from lignocellulose by using various acid hydrolysis processes. Substantially any lignin from processes separating it more or less completely from cellulose, may be used to bond other lignocellulose material when subjected to the temperatures and pressures for the periods of time presented hereinafter.

It is realized that modern chemistry does not have an exact comprehension of the term "lignin" and that the various commercial lignins are not chemically identical and, in fact, commercial "lignin" may be an alkali or alkaline earth salt of the organic lignin structure. Moreover, even the "lignins" obtained from the various lignocellulosic plants or trees vary slightly as to their methoxy content and other properties. The method of obtaining lignin, whether by chemical or mechanical treatment will affect the chemical and physical properties of the lignin. Furthermore, the methoxy content of lignin may vary in the lignin obtained from different parts of the same tree or agricultural plant. Nevertheless, all these various lignins as prepared by any of the many known methods are operable and are intended to be embraced within the scope of this invention and its claims.

Examples of a few operable commercial lignins are: Indulin C, a sodium salt of lignin obtained from the sulfate process; and Indulin A, substantially a "free" or "pure" lignin also obtained from the sulfate process, and both these indulins are produced by the West Virginia Pulp and Paper Company; Meadol, a lignin obtained from the soda process and produced by the Mead Corporation; Benaloid, obtained by treating wood with high pressure steam, a product produced by the Masonite Corporation; acid hydrolysis lignin from either the Scholler process or from the Katzen-Othmer process (Industrial and Engineering Chemistry, vol. 34, page 314), or from any other acid wood hydrolysis process such as that of the Stora Kopparbergs Bergslags Aktiebolag of Falun, Sweden; Goulac, a lignin obtained from the sulfite process and produced by the Robeson Process Company; Silvacon, a lignin produced by the Weyerhauser Timber Company from the bark of Douglas fir; Arborite, a lignin obtained from the soda process and produced by the Howard Smith Paper Mills; and many others.

Most of the commercially available lignins are contaminated with cellulose or other polysaccharides, the amount present varying from about 20 to about 40 percent; or they are lignin salts of sodium, calcium, or other metals. Indulin A, on the other hand is substantially a 100 percent "pure" or "free" lignin compound; and it and similar materials are obtained by acidulating with strong acids the lignin salts that are recovered from pulp and similar manufacturing process.

We prefer to add lignin to the lignocellulose as an air-dry powder, although the moisture content of the lignin may vary widely as in the case of the lignocellulose itself and still be usable in our invention. This lignin may come directly from a prior, wet manufacturing operation, without drying, if desired. The mesh size of the lignin powder may be important due to desirability of thorough mixing. A fine lignin powder is usually preferred.

In preparing wallboard and molded products, according to our invention, powdered lignin is mixed with the lignocellulose in an amount varying from about 2 percent to about 50 percent, depending on the source and purity of the lignin used. (In referring to percentages in all examples, the total amount of naturally moist or air-dry lignocellulose material and the added lignin is taken as 100% unless otherwise specified. For example: if in a 10 pound mixture of lignocellulose material and added lignin there is present 20 percent lignin (e. g., Indulin A), this means that there is present in the mixture 2 pounds of lignin and 8 pounds of lignocellulose material.)

A very interesting and unpredictable discovery was made after thousands of experiments were completed, including those in Table II, and after the independent variables were carefully studied over a wide range. It was found that the best all around cured board made from both a physical and chemical standpoint had a total lignin percentage in the mixture prior to being pressed and heated equal to about 33-40% (dry basis).

For example: A mixture containing 325 grams of fibrous, 30 mesh, white pine lignocellulose material having a moisture content of about 10 per cent, i. e., 292.5 grams dry lignocellulose, which, upon analysis, yielded 83.4 grams lignin (28.5 percent natural lignin) (dry basis) and 19.5 grams of "free" or "added" lignin, Indulin A (.06×325=19.5 grams) was prepared. The lignin content of this mixture prior to being subjected to pressing was approximately 35 percent of the bone-dry weight of the constituents (dry basis).

When the above mixture is hot pressed for 11 to 13 minutes, at a temperature of 250° C. and at a pressure of 580 pounds per square inch, a board is produced which has a flexural strength (or modulus of rupture) of about 4,500 pounds per square inch. This flexural strength is the highest strength that can be obtained regardless of the variation of the independent variables such as time, temperature, pressure, lignocellulose species, quantity of initial charge, amount, pH value, and type of lignin. Variables such as percent moisture and mesh size of the raw material affect the final strength values of the cured board.

The inability of the natural active lignin to flow when pressing large particles of lignocellulose material prevents a possible chemical combination either with itself or with the lignocellulose that is present, or with the added lignin and consequently a hard, strong dense board is not obtained when using large particles. However, if very long, thin, fibrous materials are used, not only is an added advantage of the mechanical interlocking of the natural fibers obtained, which enhances the strength of the final board as much as 20%, but also the flow of the natural and most active lignin is much more easily attained.

When, employing a softwood species, we use a mixture of fibrous, 30 mesh hardwood (e. g., sugar maple containing 20 percent natural lignin (dry basis) and 8 percent moisture) we found that about 15 percent additional pure lignin is needed in order to obtain the strongest board possible upon pressing for 12 minutes at a temperature of 250° C. and at a pressure of 580 pounds per square inch. Such an addition of "pure" lignin brings the lignin percentage in the mix, prior to being subjected to high temperatures and pressure, to about 35% (dry base).

vary within wide limits, since pressures within the range from 100 pounds per square inch to 1,000 pounds per square inch are operable, though pressures within the range of 300 to 750 pounds per square inch are preferred. The time needed for pressing the board at the above temperatures may vary from 5 to 60 minutes, although 9 to 15 minutes is usually preferred. While we have found some correlation between pressures, temperatures, and time, i. e., greater curing time permits the use of lower pressures or vice versa; nevertheless, we have found it necessary to have a minimum temperature of about 205° C. to obtain a suitable board or pressed product.

The following relationship between platen temperature and board temperature was found by the use of thermocouples inserted in the midpoint of the loose lignocellulose-lignin mixture, prior to subjecting this mixture to high temperatures and pressure, to form a board $\tfrac{3}{16}$ inches in thickness. The thermocouple wires in these experiments were then molded into the finished board.

| Time, minutes | 0 | 1 | 2 | 3 | 4 | 5 | 6 | 7 | 8 | 9 | 10 | 11 | 12 |
|---|---|---|---|---|---|---|---|---|---|---|---|---|---|
| Material Temp., °C | 25 | 72 | 95 | 109 | 125 | 135 | 149 | 180 | 190 | 205 | 222 | 240 | 250 |
| Platen Temp., °C | 240 | 240 | 238 | 238 | 238 | 238 | 238 | 241 | 243 | 244 | 246 | 248 | 250 |
| Pressure in pounds per square inch | 0 | 100 | 100 | 200 | 200 | 300 | 300 | 400 | 400 | 600 | 600 | 750 | 750 |

It can be stated, therefore, based on the thousands of experiments made, that whenever the final lignin content of the mixture, prior to pressing is less than 33%, the resulting board will possess low flexural strength and low hardness; but a high degree of water absorption. On the other hand, whenever the final lignin content is greater than 40%, the flexural strength is low, the hardness is high and the water absorption is low. Whenever the over-all lignin content of the resulting cured board was from 33 to 40% (dry basis), then we obtained a board of the highest strength and the best workable qualities.

The mixing of the lignocellulose and the lignin is effected by any conventional mechanical dry mixer to yield a thoroughly blended product. The blended dry mixture is then poured, or dumped, for example, into a pan having a faceplate in the bottom and sidewalls constituting a deep frame. The mixture is then covered with a wire mesh screen having about 20 wires to the inch and of a size to fit loosely in the pan. The use of this deckel arrangement for making the board may not be necessary, as boards can be made on a continuous basis or simply hot-pressed in between two plates or screens. The purpose of the screen is to facilitate the escape of vapors formed during the hot pressing cycle. The pan and the contents therein are then placed between a pair of heated platens of a hydraulic or equivalent press and subjected to varying pressures for a specified period of time. Other methods of molding used in the art are also applicable, and in some cases it is preferred to use the screen for the bottom of the pan and the faceplate or another screen for the top.

The temperature we employ in the upper and lower platens during the pressing operation in order to bond the lignocellulose and the added lignin to give a strong wallboard, may vary from 205° C. to 300° C., a range between 220° C. and 275° C. being preferred. The pressure we apply to the lignocellulose and lignin mixture also may Obviously, the final board temperature is closely related to and substantially the same as the final platen temperature.

We have found, as shown by the following examples, that an actual chemical change takes place in the making of boards of lignocellulose and added lignin according to our process. The results of the boards made as listed in Table I illustrate the improvement in the phyiscal properties of wallboard which are due to the unexpected chemical change effected in the mixture of lignocellulose and the added lignin when the pressing conditions specified hereinabove are employed.

The "uncombined" or chemically unaltered lignin from each board indicated in Table I was obtained by extracting the mixture or final board, with a one percent sodium hydroxide solution, since "free" or "pure" lignin and lignin salts are completely soluble in a one percent sodium hydroxide solution. The extract was then analyzed by the accepted standard analysis for lignin using concentrated sulfuric acid.

From the material before pressing, as indicated by 1 and 2 in Table I, it is evident that added lignin is completely soluble in one percent sodium hydroxide solution, whereas the natural lignin in the lignocellulose material that is to be compressed into a board is very sparingly soluble.

The board labeled 3 gives the physical properties obtained when the lignocellulose material alone is heated and pressed into a board, at the optimum conditions specified in this disclosure. The properties of this board, which may be regarded as those of a "blank" or control experiment, are used as the basis for determining any improvement as compared to boards made with added lignin.

Boards 4 through 8 illustrate very clearly that high temperatures effect a chemical action in the added lignin and the lignocellulose material. As the optimum conditions are approached, the flexural strength and hardness of the final cured board increases; whereas the absorption of water and the amount of lignin extracted from boards prepared under these conditions decreases.

The result of 9 illustrates that when lignin alone is heated in an inert nitrogen atmosphere to a temperature of 250° C., it becomes chemically and physically altered. It becomes a friable and brittle solid, dark chocolate in color, and only slightly soluble in a one percent sodium hydroxide solution. Thus the added lignin itself undergoes chemical change at this temperature.

Board 10 is a commercial board, Masonite. The free lignin is greater in amount in this board than in boards 7 or 8, which are optimum boards under these conditions for our process.

Table II presents the properties of only a few of the resulting wallboards produced from mixtures containing lignocellulose and added lignin.

Table I

| No. | Wallboard Composition | Conditions for Pressing | | | MOR or Flexural Strength (p. s. i.) | Barcol Surface Hardness | Percent Water Absorbed in 24 Hours Full Immersion | Percent Lignin Extracted By a One Percent NaOH Solution | Percent NaOH Sol. Absorbed in 24 Hours Full Immersion In a One Percent NaOH Sol. |
|---|---|---|---|---|---|---|---|---|---|
| | | Time of Pressing (Minutes) | Temperature (° C.) | Pressure (p. s. i.) | | | | | |
| 1 | White pine, 30 mesh wood flour. | Unpressed | | | | | | 0.2 | |
| 2 | White pine, 30 mesh wood flour, plus 8% lignin (Indulin A). | Unpressed | | | | | | 8.2 | |
| 3 | White pine, 30 mesh wood flour. | 11 | 250 | 580 | 2,050 | 35 | 58.1 | 2.2 | 88.0. |
| 4 | White pine, 30 mesh wood flour, plus 8% lignin (Indulin A). | 11 | 180 | 580 | 1,050 | 0 | Disintegrated | 8.4 | Disintegrated. |
| 5 | do | 11 | 225 | 580 | 3,950 | 50 | 38.3 | 4.0 | 95.4. |
| 6 | White pine, 30 mesh wood flour, plus 15% lignin (Indulin A). | 11 | 225 | 580 | 4,390 | 60 | 28.1 | 8.3 | 88.0. |
| 7 | White pine, 30 mesh wood flour, plus 8% lignin (Indulin A). | 11 | 250 | 580 | 4,800 | 64 | 18.5 | 2.1 | 33.3. |
| 8 | White pine, 30 mesh wood flour, plus 6% lignin (Indulin A). | 13 | 250 | 580 | 5,350 | 68 | 12.3 | 1.9 | 20.1. |
| 9 | 10 grams of lignin (Indulin A) (In an inert atmosphere, nitrogen). | 11 | 250 | | | | | 2.2 | |
| 10 | Masonite (3/16" in thickness). | | | | 5,500 | 35 | 20.0 | 4.5 | 163.2. |

Table II

| Board No. | Lignocellulose | | Kind of Lignin and Percent of Total Charge | Moisture of Lignocellulose (Percent) | Percent Lignin Dry Basis Present In Mixture | Molding Temperature, °C. |
|---|---|---|---|---|---|---|
| | Specie | Mesh Size | | | | |
| 1 | White Pine | 16 and higher | Indulin A 15 | 8 to 9 | 43 | 220 |
| 2 | do | do | Indulin A 2 | 8 to 9 | 30 | 270 |
| 3 | do | do | Indulin A 8 | 8 to 9 | 37 | 250 |
| 4 | do | do | Indulin A 15 | 8 to 9 | 43 | 260 |
| 5 | do | do | Indulin A 6 | 8 to 9 | 34 | 250 |
| 6 | do | do | Indulin A 20 | 8 to 9 | 45 | 205 |
| 7 | do | do | Indulin A 10 | 8 to 9 | 39 | 300 |
| 8 | do | do | Indulin A 15 | 8 to 9 | 43 | 250 |
| 9 | do | do | Indulin A 7 | 8 to 9 | 35 | 300 |
| 10 | do | do | Indulin A 7 | 8 to 9 | 35 | 205 |
| 11 | Bagasse | 16 plus | Indulin A 7 | 8 to 12 | 30 | 200 |
| 12 | do | do | Indulin A 7 | 8 to 12 | 30 | 250 |
| 13 | Eucalyptus (fibrous) | do | Indulin A 7 | 8 to 12 | 29 | 255 |
| 14 | Maple | do | Indulin A 7 | 8 to 12 | 31 | 250 |
| 15 | Yellow Pine | do | Indulin A 7 | 8 to 12 | 36 | 250 |
| 16 | Gum Poplar (fibrous) | do | Indulin A 7 | 8 to 12 | 35 | 250 |
| 17 | Douglas Fir | do | Indulin A 7 | 8 to 12 | 28 | 230 |
| 18 | Redwood | do | Indulin A 7 | 8 to 12 | 37 | 250 |
| 19 | S. African Wattle | do | Indulin A 7 | 8 to 12 | 28 | 250 |
| 20 | Mangle | do | Indulin A 15 | 8 to 12 | 30 | 250 |
| 21 | Sugar Maple | do | Indulin A 15 | 8 to 12 | 34 | 250 |
| 22 | Eucalyptus | do | Indulin A 9 | 8 to 12 | 33 | 250 |
| 23 | White Oak | do | Indulin A 15 | 8 to 12 | 34 | 250 |
| 24 | Aspen | do | Indulin A 15 | 8 to 12 | 35 | 250 |
| 25 | Wattle | do | Indulin A 15 | 8 to 12 | 36 | 250 |
| 26 | Mangle | do | Indulin A 10 | 8 to 12 | 37 | 250 |
| 27 | Bagasse | do | Scholler 14 | 8 to 9 | 33 | 250 |
| 28 | White Pine | 16-30 | Katzen 20 | 8 to 9 | 30 | 250 |
| 29 | do | 16-30 | Katzen 50 | 8 to 9 | 33 | 250 |
| 30 | do | 16-30 | Goulac 12 | 8 to 9 | 40 | 250 |
| 31 | do | 16-30 | Nat. Southern 8 | 8 to 9 | 34 | 250 |
| 32 | do | 16-30 | Meadol 10 | 8 to 9 | 30 | 250 |
| 33 | do | 16-30 | Indulin C 10 | 8 to 9 | 31 | 250 |
| 34 | do | 16-30 | Arborite 9 | 8 to 9 | 32 | 250 |
| 35 | do | 16-30 | Bonaloid 16 | 8 to 9 | 35 | 250 |
| 36 | do | 16-30 | Silvacon 12 | 8 to 9 | 32 | 250 |
| 37 | do | 16-30 | | 8 to 9 | 33 | 250 |
| 38 | do | 16-30 | Stora Koppabergs Hydrolyzed Wood. 20 | 8 to 9 | 33 | 250 |

Table II.—Continued

| Board No. | Lignocellulose Specie | Lignocellulose Mesh Size | Kind of Lignin and Percent of Total Charge | | Moisture of Lignocellulose (Percent) | Percent Lignin Dry Basis Present In Mixture | Molding Temperature, °C. |
|---|---|---|---|---|---|---|---|
| 39 | White Pine | 30 | Indulin A | 7 | 0 | 37 | 250 |
| 40 | do | 30 | Indulin A | 7 | 5 | 34 | 250 |
| 41 | do | 30 | Indulin A | 7 | 15 | 35 | 250 |
| 42 | do | 30 | Indulin A | 7 | 30 | 36 | 250 |
| 43 | do | 30 | Indulin A | 7 | 50 | 39 | 250 |
| 44 | do | 30 | Indulin A | 7 | 0 | 36 | 250 |
| 45 | do | 30 | Indulin A | 7 | 30 | 36 | 250 |
| 46 | do | 30 | Indulin A | 7 | 50 | 39 | 250 |
| 47 | do | 1" squares .005" thick. | Indulin A | 7 | 8 to 9 | 33 | 250 |
| 48 | do | Defibrated fibers, .5–1.0" long, .01–.001" thick. | Indulin A | 7 | 8 to 9 | 39 | 250 |
| 49 | Yellow Pine (Asplund Fibers). | | Indulin A | 3 | 8 to 9 | 37 | 250 |
| 50 | Masonite Pressed Wood purchased from local lumberman. | | | | | | |

| Board No. | Final Pressure (p. s. i.) | Pressing Time (Min.) | Thickness of Molded Wallboard in Inches | Specific Gravity | Flex. Str. or Modulus of Rupture (p. s. i.) | Surface Hardness Barcol Scale | Immersion 24 Hrs. in Water | |
|---|---|---|---|---|---|---|---|---|
| | | | | | | | Increase in Weight in Percent | Increase in Thickness in Percent |
| 1 | 600 | 10 | 0.187 | 1.11 | 4,000 | 55 | 30.0 | 14.3 |
| 2 | 1,000 | 8 | 0.166 | 1.12 | 3,900 | 60 | 29.2 | 11.3 |
| 3 | 800 | 12 | 0.218 | 1.18 | 5,450 | 65 | 18.0 | 5.6 |
| 4 | 300 | 40 | 0.77 | 0.83 | 3,000 | 25 | 33.1 | 8.7 |
| 5 | 750 | 11 | 0.145 | 1.10 | 4,750 | 50 | 25.8 | 9.9 |
| 6 | 100 | 30 | 0.210 | 1.03 | 2,500 | 35 | 45.1 | 21.2 |
| 7 | 350 | 30 | 0.833 | 1.05 | 2,920 | 34 | 34.6 | 17.2 |
| 8 | 100 | 60 | 0.325 | 1.15 | 3,520 | 47 | 30.1 | 16.2 |
| 9 | 500 | 5 | 0.185 | 1.0 | 3,270 | 48 | 33.1 | 16.0 |
| 10 | 600 | 15 | 0.218 | 1.02 | 2,250 | 20 | 56.5 | 38.5 |
| 11 | 560 | 11 | 0.188 | 1.03 | 3,800 | 45 | 30.7 | 7.8 |
| 12 | 560 | 14 | 0.233 | 1.15 | 4,000 | 50 | 29.5 | 7.1 |
| 13 | 560 | 14 | 0.225 | 1.20 | 5,010 | 55 | 12.3 | 3.2 |
| 14 | 560 | 15 | 0.215 | 1.10 | 3,420 | 40 | 31.3 | 11.7 |
| 15 | 560 | 12 | 0.152 | 1.12 | 5,300 | 58 | 12.4 | 8.0 |
| 16 | 560 | 10 | 0.143 | 1.05 | 5,325 | 60 | 4.8 | 3.5 |
| 17 | 560 | 12 | 0.158 | 1.01 | 3,950 | 52 | 33.1 | 14.1 |
| 18 | 560 | 9 | 0.148 | 1.19 | 6,250 | 70 | 8.1 | 2.6 |
| 19 | 560 | 20 | 0.365 | 1.12 | 3,300 | 45 | 33.6 | 9.8 |
| 20 | 560 | 15 | 0.252 | 1.14 | 3,710 | 48 | 30.1 | 8.9 |
| 21 | 560 | 12 | 0.185 | 1.18 | 4,400 | 53 | 29.5 | 10.3 |
| 22 | 560 | 13 | 0.163 | 1.20 | 5,100 | 58 | 12.5 | 3.0 |
| 23 | 560 | 13 | 0.180 | 1.15 | 3,900 | 50 | 30.0 | 12.8 |
| 24 | 560 | 11 | 0.165 | 1.20 | 4,900 | 60 | 15.0 | 6.6 |
| 25 | 560 | 14 | 0.165 | 1.15 | 3,800 | 50 | 30.1 | 8.5 |
| 26 | 560 | 14 | 0.191 | 1.14 | 3,900 | 50 | 27.3 | 9.1 |
| 27 | 560 | 12 | 0.181 | 1.11 | 4,100 | 50 | 27.1 | 7.0 |
| 28 | 560 | 12 | 0.202 | 1.09 | 4,350 | 54 | 39.2 | 18.1 |
| 29 | 560 | 14 | 0.213 | 1.11 | 4,500 | 58 | 33.3 | 12.6 |
| 30 | 560 | 16 | 0.225 | 1.15 | 5,300 | 65 | 18.1 | 7.3 |
| 31 | 560 | 12 | 0.195 | 1.12 | 4,100 | 48 | 37.3 | 21.1 |
| 32 | 560 | 12 | 0.183 | 1.12 | 4,930 | 54 | 22.2 | 6.5 |
| 33 | 560 | 12 | 0.191 | 1.09 | 4,200 | 45 | 38.8 | 23.8 |
| 34 | 560 | 12 | 0.186 | 1.10 | 4,300 | 45 | 37.4 | 25.4 |
| 35 | 560 | 12 | 0.181 | 1.13 | 5,410 | 62 | 19.5 | 6.7 |
| 36 | 560 | 12 | 0.199 | 1.12 | 5,230 | 60 | 20.1 | 7.9 |
| 37 | 560 | 12 | 0.185 | 1.14 | 5,290 | 65 | 14.1 | 4.8 |
| 38 | 560 | 14 | 0.199 | 1.15 | 4,460 | 64 | 32.5 | 11.8 |
| 39 | 750 | 11 | 0.165 | 1.17 | 5,620 | 70 | 12.2 | 3.0 |
| 40 | 750 | 11 | 0.170 | 1.13 | 5,000 | 60 | 18.5 | 6.1 |
| 41 | 750 | 11 | 0.171 | 1.16 | 4,950 | 60 | 19.6 | 7.4 |
| 42 | 750 | 11 | 0.168 | 1.2 | 6,500 | 72 | 11.8 | 3.0 |
| 43 | 750 | 11 | 0.165 | 1.21 | 6,520 | 73 | 11.0 | 3.2 |
| 44 | 560 | 12 | 0.168 | 1.16 | 5,600 | 71 | 12.0 | 4.1 |
| 45 | 560 | 12 | 0.165 | 1.19 | 6,440 | 74 | 14.1 | 3.9 |
| 46 | 560 | 12 | 0.166 | 1.21 | 6,600 | 75 | 12.1 | 3.3 |
| 47 | 750 | 12 | 0.196 | 1.09 | 3,350 | 45 | 30.6 | 18.2 |
| 48 | 750 | 10 | 0.161 | 0.91 | 6,300 | 72 | 12.3 | 1.9 |
| 49 | 750 | 12 | 0.145 | 1.05 | 6,500 | 75 | 25.0 | 3.1 |
| 50 | | | 0.185 | 1.03 | 5,500 | 35 | 20.0 | 8.5 |

The independent variables that were considered in Table II are as follows:
(1) Wood species
(2) Mesh size of material
(3) Moisture content
(4) Temperature
(5) Pressure
(6) Time
(7) Lignin used
(8) Percentage of added lignin
(9) Percent of lignin (dry basis) present in the mixture prior to being pressed and heated
(10) Quantity of initial charge The dependent variables that were considered in Table II are as follows:
(1) Flexural strength or modulus of rupture
(2) Hardness
(3) Density
(4) Water absorption
(5) Swelling after immersion in water In Table II hydrolyzed wood lignin obtained either by the Scholler process or the Katzen-Othmer process, or any other hydrolysis process.

may contain considerable amounts of cellulose, depending upon the degree of acid hydrolysis given to the original fibers. For example, the hydrolyzed wood lignin may contain about 50 percent lignin as determined by standard lignin analysis, and 50 percent cellulose and similar components. This, for example, is the amount of cellulose that was analyzed to be present with the "lignin" obtained from the Katzen-Othmer hydrolysis process. Consequently, "hydrolyzed wood lignin" is sometimes referred to as "hydrolyzed wood." Such a hydrolysis process and product may also be operated with bagasse or other lignocellulose material from annual plants. In this invention "hydrolyzed wood" is regarded as being produced from other lignocellulose material than wood and it is also regarded as substantially equivalent to lignin from other sources; although because of different amounts of impurities and "activeness" of the lignin, different percentages were used in our mixtures.

In Table II we have listed only those boards made from substantially dry lignocellulose particles or fibers and those which, while containing up to 50% moisture, still seem dry to the touch. This is because we have preferred to operate our process using a dry forming and pressing technique because of the relative cheapness and simplicity of the equipment required for such a dry process; and because of the economy in pressing and the shorter pressing cycle which is possible, because a large amount of water as in a wet process does not have to be handled. However, we have also found that the addition of lignin to lignocellulose material for making wallboard and the like may be applied to wet-process plants; or where for other reasons it is desired to use a wet-process, we have found that the addition of lignin to the stock or slurry results in an improved board and having the properties shown in Table II for equivalent lignocellulose-lignin mixtures of the dry process. For example: If a slurry of white pine, 30 mesh, fibrous material is initially pressed into a mat and next inserted between two hot platens having a temperature of 250° C., and finally pressed at a pressure of 600 pounds per square inch for 12 minutes, the final board will have a flexural strength of approximately 4,000 pounds per square inch. On the other hand, when 6 percent lignin, for example, Indulin A which is a lignin obtained from waste black liquor of the sulfate or kraft process used in pulping hard pine wood, is added to a slurry of white pine, 30 mesh, fibrous material prior to its being formed into a mat, and this mixture of added lignin and lignocellulose material is later compressed into a cured board at a temperature of 250° C., at a pressure of 600 pounds per square inch, and for a time interval of 12 minutes, then the flexural strength of the cured board will be approximately 5,000 pounds per square inch or higher.

We may also add materials to the lignocellulose fibers to increase the water resistance of the finished board or to accomplish other desired results. In particular, the addition of mineral oils, vegetable or animal oils or fats, or petrolatum and other like high molecular weight hydrocarbons gives a product which possesses desirable water resistance.

We may also add fire-proofing agents or insecticides to the lignocellulose fibers to make a superior product possessing fire-proof or insecticidal qualities.

In our discussion above we have shown the advantages which we have found in the use of combinations of our preferred materials with lignocellulose in the production of wallboard made directly from sawdust or from other lignocellulosic granules or fibers in either a dry or a wet process. We have also found that we can use the same combinations of materials and under the above specified conditions of pressure, time, and temperature which are required for the making of wallboard in the production of other shapes and articles wherein similar physical properties are desired as in wallboard. It is especially desirable to make such objects when the cost of the raw material is important, because the materials we use are very cheap. Particularly useful are our methods and the products resulting in those cases where the cross-sectional dimension of the final object is not too great, and wherein it is possible to mold the material with some provision for the escape of gases, and wherein the shape of the final object is not too complicated and does not require too great an ability of the raw material to flow in filling the mold. In this case, our preferred combination of materials acts substantially as a molding powder of peculiar properties and of comparative cheapness to other similar molding powders which have been suggested and are used in the art.

We have also found that our combination of materials may be added directly as an upper or lower layer or both in a final application on the surface of an assembly of veneers for the making of plywood. Thus, a smooth, fine surface, similar to that which is produced in making wallboard by our preferred process, is obtained on the surface of the plywood regardless of any irregularities or imperfections in the plywood itself. Besides eliminating the objectionable grain in some of the rotary cut veneers, irregularities such as knots, etc. may be removed from the surface finish by the application of a mixture of lignocellulosic granules or fibers together with the other materials as specified above. In some cases we have found that the same application of a fine lignocellulosic material together with added materials as specified above, may be applied to rough lumber or even planed lumber which has imperfections therein; thus, a fine surface is achieved immediately without imperfections, and without surfacing operations which remove and make thinner the wood. The imperfections in the lumber or in the plywood are then finally out of sight beneath a hard dense surface with a very fine and smooth pattern depending upon the particular type and size of the wood fibers or granules used. In this use we often prefer a fine granular or fibrous material such as from 30 to 80 or even finer mesh in order to give a thin coating of smooth surface qualities.

This invention has been described broadly and is exemplified herein by many embodiments, but it is not to be limited to the illustrative embodiments presented hereinabove.

This invention is a continuation in part of our application Serial Number 675,444, filed June 8, 1946.

We claim:

1. A dry process for obtaining molded products comprising mixing substantially dry to naturally moist lignocellulose pourable particles with 2 to 50% of substantially air dry lignin powder to obtain a composition having an over all lignin percentage of 33 to 40% calculated on the bone dry basis of the resulting mixture, heating the mixture to 205 to 300° C. at a pressure of 100 pounds to 1,000 pounds per square inch for a temperature sufficiently long to effect chemical bonding of the lignocellulose to said lignin whereby a hard, dense water-resistant molded product of chemically interlocked lignocellulose with lignin is obtained.

2. The method of claim 1 wherein the temperature ranges from 220° to 275° C. and the pressure ranges from 300 to 750 pounds per square inch.

DONALD F. OTHMER.
WARREN R. SMITH.

References Cited in the file of this patent

UNITED STATES PATENTS

| Number | Name | Date |
|---|---|---|
| 1,311,220 | Ellis | July 29, 1919 |
| 1,501,975 | Strehlenert | July 27, 1924 |
| 1,724,393 | Carpenter | Aug. 13, 1929 |
| 2,153,316 | Sherrard et al. | Apr. 4, 1939 |
| 2,247,207 | Schorger | June 24, 1941 |
| 2,392,163 | Lewis | Jan. 1, 1946 |
| 2,485,587 | Goss | Oct. 25, 1949 |